United States Patent [19]

Malwitz

[11] 4,430,840

[45] Feb. 14, 1984

[54] FOAM, COMPOSITION AND METHOD USEFUL FOR RETROFIT INSULATION

[75] Inventor: Nelson Malwitz, Brookfield, Conn.

[73] Assignee: Sealed Air Corporation, Fairlawn, N.J.

[21] Appl. No.: 478,314

[22] Filed: Mar. 24, 1983

Related U.S. Application Data

[62] Division of Ser. No. 391,007, Jun. 23, 1982, Pat. No. 4,401,769.

[51] Int. Cl.$^3$ .......................... E04G 21/00; E04C 1/00
[52] U.S. Cl. ....................................... 52/743; 52/309.4
[58] Field of Search .................... 52/743, 309.4, 309.9

[56] References Cited

U.S. PATENT DOCUMENTS

| | | | |
|---|---|---|---|
| 2,690,987 | 10/1954 | Jeffries | 428/317 |
| 3,072,582 | 1/1963 | Frost | 521/131 |
| 3,307,318 | 3/1967 | Bauman | 52/743 |
| 3,391,093 | 7/1963 | Frost | 521/131 |
| 3,524,825 | 8/1970 | Rill, Jr. | 521/131 |
| 3,657,161 | 4/1972 | Bernard et al. | 521/155 |
| 3,666,848 | 5/1972 | Harper et al. | 264/39 |
| 3,876,567 | 4/1975 | Larkin et al. | 521/125 |
| 3,884,917 | 5/1975 | Ibbotson | 521/129 |
| 3,887,501 | 6/1975 | Narayan et al. | 521/107 |
| 3,896,052 | 7/1975 | Lockwood et al. | 521/128 |
| 3,931,065 | 1/1976 | Ashida et al. | 521/174 |
| 3,965,052 | 6/1976 | Iwasaki | 521/107 |
| 3,984,359 | 10/1976 | Collins et al. | 521/167 |
| 4,092,276 | 5/1978 | Narayan | 521/108 |
| 4,101,465 | 7/1978 | Lockwood et al. | 408/122.5 |
| 4,129,697 | 12/1978 | Schapel et al. | 521/176 |

FOREIGN PATENT DOCUMENTS 2614993 10/1977 Fed. Rep. of Germany ........ 52/743

Primary Examiner—John E. Murtagh
Assistant Examiner—Andrew Joseph Rudy
Attorney, Agent, or Firm—Lerner, David, Littenberg, Krumholz & Mentlik

[57] ABSTRACT

A foam made from the reaction of a multifunctional isocyanate and a catalytic amount of an isocyanate polymerizing catalyst and method for making such foam are disclosed in which the foam is modified by forming the foam in the presence of water and a softening agent selected from the group consisting of a chlorinated alkane, brominated alkane, alkyl ester of an alkanoic acid, alkylene oxide, aromatic hydrocarbon, acylnitrile, aliphatic ketone, aliphatic aldehyde, aliphatic ether, alicyclic ether, amide of an alkanoic acid, and mixtures thereof, wherein the foam is modified by the water and the softening agent in an amount effective to provide a gel time which exceeds the rise time of the foam. A method of filling wall cavities with the foam and composition for preparing the foam are also disclosed.

22 Claims, No Drawings

FOAM, COMPOSITION AND METHOD USEFUL FOR RETROFIT INSULATION

This is a division of application Ser. No. 391,007, filed June 23, 1982 now U.S. Pat. No. 4,401,769.

BACKGROUND OF THE INVENTION

The present invention relates to polymeric foams. More specifically, the invention relates to foams of diphenylmethane diisocyanates which are useful as retrofit insulation.

In today's energy conservation conscious world, finding ways to better insulate our homes is foremost on the minds of a great many people. Many different materials have been used for such insulation. For example, fiberglass insulation provides good insulation characteristics for insulation of walls, ceilings, etc. of homes. However, a large number of homes have been built in the past without sufficient insulation in their walls. Obviously, it would be very costly to rip out the walls of a home to retrofit them with insulation materials such as fiberglass. Accordingly, methods which would avoid such destruction of the walls are extremely advantageous.

Various foam materials have been used in the past in an attempt to retrofit wall cavities with insulation materials. For example, ureaformaldehyde and phenol-formaldehyde foams have been previously used by pumping such foam into the wall cavity through a hole placed in the walls. Ureaformaldhyde foam, which is commercially more important, has a number of disadvantages including friability, release of toxic formaldehyde if poorly applied, shrinkage with subsequent loss of insulation effectiveness, and limited warm temperature resistance that prohibits its use in walls in warmer climates and in attics. The major drawback of loose-fill insulation products is settling with time, creating uninsulated voids in wall cavities. Impracticality prohibits the use of more conventional insulation materials (such as, urethane board stock, fiberglass, polystyrene, foamed glass, polyolefin foams) to retrofit wall sections simply because of the difficulty of manufacturing and/or installing at the site without extensive building damage.

Polyurethane and polyisocyanurate foams are well-known as effective insulation materials. However, using such prior polyurethane or polyisocyanurate foams to retrofit wall cavities with insulation has met with certain difficulties. First, the polyurethane or polyisocyanurate insulating foams have been too dense to make them economical as insulation for wall cavities. For example, most walls contain cavities in the range of three and five-eights inches thick. The amount of polyurethane or polyisocyanurate foam needed to fill these large cavities cannot be economically justified in terms of the insulation obtained by the foam, e.g., satisfactory insulation characteristics would be economically obtained with a foam about 2 inches thick. Moreover, the prior polyurethane or polyisocyanurate foams used to retrofit wall cavities with insulation have had other problems because they have rise times which exceed their gel or set times. Thus, such a foam first sets within the wall cavity to such an extent that the pressure generated within the cavity causes damage as the foam completes its expansion. Also, excess foam inadvertently admitted into the wall cavity will not continue to extrude through the access hole in the wall. The foam then continues to expand creating a pressure pushing on the walls of the cavity, in many instances causing buckling or even cracking of the walls.

Various disclosures of retrofitting wall cavities with foam materials are disclosed in the prior art. For example, U.S. Pat. No. 2,690,987 discloses a resin foamed structure in which an alkyd resindiisocyanate mixture is used as a coating composition on the inner face of the structure walls. A foaming composition containing diisocyanate is then introduced between the wall surfaces. The coating is said to aid the free rise of the foam during the gas evolution step and to lubricate the walls of the structure and allow a free rise of the foam.

A large number of other patents disclose certain polyurethane, polyisocyanurate and polycarbodiimide foams, e.g., U.S. Pat. Nos. 3,524,825; 3,666,848; 3,876,567; 3,884,917; 3,887,501; 3,896,052; 3,965,052; 3,984,359; 4,092,276; 4,101,465 and 4,129,097. A number of these patents disclose, i.a., foams containing methylene chloride and/or water, but none of these patents disclose the production of a rigid, closed cell foam suitable for retrofitting wall cavities with insulating material by employing a softening agent and water to provide a foam having a low density, good insulation characteristics, and a rise time greater than gel or set time. Moreover, it is the general teaching in the art that the inclusion of materials such as methylene chloride in foams should be avoided especially in rigid foams because such materials tend to dissolve the polymers causing degradation and discoloration of the polymers. In addition, other have reported that these materials cause the polymers to shrink, warp badly, and turn brown, see for example Frost's U.S. Pat. Nos. 3,391,093 and 3,072,582.

SUMMARY OF THE INVENTION

It has now been found unexpectedly that a rigid foam suitable for retrofitting wall cavities with insulating material is provided by foam made from the reaction of diphenylmethane diisocyanate, prepolymers of diphenylmethane diisocyanate or mixtures thereof, water, and a catalytic amount of isocyanate polymerizing catalyst, wherein said foam is formed in the presence of a softening agent selected from the group consisting of chlorinated alkane, brominated alkane, alkyl ester of an alkanoic acid, alkylene oxide, aromatic hydrocarbon, acylnitrile, aliphatic ketone, aliphatic aldehyde, aliphatic ether, cyclic ether, amide of an alkanoic acid, and mixtures thereof, and wherein said water and softening agent are present in amounts effective to provide a gel time which exceeds the rise time of the foam. The present invention also provides compositions for preparing such a foam and methods of retrofitting walls with such foam.

Such a foam has a number of highly advantageous properties. Such foams are good insulators with a relatively low density, preferably, in the range of from about 0.6 to about 1.5 pounds per cubic foot, and more preferably, from about 1.0 to about 1.2 pounds per cubic foot. Thus, when these foams are formed in a wall cavity of a house, they provide good insulation at a more economical cost. Moreover, these foams have gel times which exceed the rise time of the foam, so that, when the foam is formed in the wall cavities of a house, the foam completes its rise prior to setting and thus puts a minimum amount of pressure on the walls of the cavity.

DETAILED DESCRIPTION OF THE INVENTION

The foams of the present invention are rigid, closed cell urea-modified isocyanurate foams. Rigid foams are characterized, for example, as having a glass transition temperature above room temperature, a high ratio of compressive to tensile strength (about 0.5 to 1 or greater), low elongation (less than about 10%), a low recover rate from distortion, and/or a low elastic limit. By contrast, flexible foams have a high tensile strength to compressive strength (25% deflection) ratio, usually around 15 to as high as 60 or 70 to 1; high elongation; a fast recovery; and a high elastic limit. The foams of the present invention are thus distinguished from many of the prior art foams which are flexible urethane foams. Moreover, the rigid, closed cell foams of the invention provide better retrofit insulating characteristics than the prior flexible urethane foams.

It should be explained that "rise time" or "substantially complete rising" as used in the present application is intended to refer to the major or initial rise time of the foam. Actually, the foams of the invention have two rise times. The initial or major rise occurs typically at about 95% of the final volume and, with the present invention, the initial rise time takes place prior to gelling or setting of the foam. This initial rise time is the time normally referred to as "rise time" in the art. A second minor rise (the end of which determines final rise time), of about an additional 5 volume percent or less typically takes place with the present invention after gelling or setting of the foam. However, because the foam, during the second rise after gelling, is still soft enough so that it can be compressed within the wall cavity, the foam does not exert any significant pressures that might damage wall sections.

Suitable multi-functional isocyanates for use in the present invention include diisocyanates and higher functionality polyisocyanates, including both aliphatic and aromatic multi-functional isocyanates. Representative of suitable multi-functional isocyanates are diphenylmethane diisocyanate (MDI), diphenylmeane diisocyanate prepolymers and mixtures thereof. Examples of such prepolymers are higher functionality polyisocyanates, for example, crude diphenylmethane diisocyanate, also known as "polymeric isocyanate" or "polymethylene polyphenylisocyanate". Representative of the higher functionality polyisocyanates are those available under the trade names MONDUR MR (Mobay Chemical Company), PAPI (Upjohn Company) and RUBINATE M (Rubicon Chemical Company). A preferred multi-functional isocyanate is a mixture of diphenyl methane diisocyanate (MDI) and prepolymers of diphenyl methane diisocyanate (crude MDI). This crude MID prepolymer material is available under the tradename Rubinate M from Rubicon.

Examples of suitable polymerizing catalysts for use in the present invention include urethane catalysts, urea catalysts, isocyanurate catalysts and carbodiimide catalysts, or mixtures thereof. The isocyanate polymerizing catalyst should be of sufficient catalytic activity so that, as the foam of the invention rises, it can support its own weight and will not substantially collapse. Suitable polymerizing catalysts include any of the well-known trimerization catalysts, such as those mentioned in U.S. Patent Nos. 3,657,161; 3,887,501 and 3,931,161, the disclosures of which are incorporated herein by reference for purposes of exemplifying such suitable polymerizing catalysts. Representative examples of such polymerizing catalysts are (1) tertiary amine catalysts such as substituted triazines, e.g., tri(dimethylaminopropyl)triazine; (2) basic salts of weak organic acids such alkali metal salts of alkanoic acids, e.g., potassium octoate and potassium hexoate; and (3) phospholines such as 1-phenyl-3-phospholine, 3-methyl-1-phenyl-3-phospholine, 1-ethyl-3-phospholine and 3-methyl-1-phenyl-3-phospholine-1-oxide.

The amount of polymerizing catalyst may vary depending upon a number of factors, including the type and amount of multi-functional isocyanate employed, the amount of water employed, etc. Enough polymerization catalyst is employed so that the foam sets after early rising in order to obtain the effect described above wherein the foam sets after substantially complete rising thereof. Typically, the polymerizating catalyst will be present in amounts of from about 0.1 to about 10 parts by weight, per 100 parts of the multi-functioned isocyanate, with the amount actually used depending on the activity of the catalyst in driving the polymerizing reaction under consideration, e.g., urethane, urea, isocyanurate and/or carbodiimide polymerization catalyst activity. Thus, for example, since potassium octoate commercially available as T-45 (M&T Chemicals) is more active as an isocyanurate catalyst than tri(dimethylaminopropyl)triazine commercially available as Polycat P-41 (Abbott), less T-45, can be employed than when Polycat P-41 is used.

The softening agents as defined above act in a way so as to temporarily delay the setting or gelling of the urethane, amide, urea, carbodiimide and/or isocyanurate linkages within the freshly formed foam. The addition of these agents is necessary to achieve the desired and necessary process properties for a retrofit insulating foam. The quantity of the selected softening agent in the formulation must be judiciously selected. If too little is used, the gel time is not properly delayed beyond the rise time. If too much is used, undesirable side effects such as poor long-term dimensional stability, poor humid aging and shrinkage can result. Thus, the amount of the softening agent varies depending on various factors, including, for example, the softening agent being used. Of course, the amount of the softening agent used is effective to provide the gel time which exceeds the rise time of the foam. Typically, from about 0.05 to about 5.0 parts by weight of the softening agent is used per 100 parts by weight of the multi-functional isocyanate. More preferably, the foam of the present invention is modified by forming the foam in the presence of from about 0.3 to about 1.0 parts of the softening agent per 100 parts by weight of the multi-functional isocyanate.

Suitable softening agents include chlorinated alkanes, brominated alkanes, alkyl esters of an alkanoic acid, alkylene oxides, aromatic hydrocarbons, acylnitriles, aliphatic ketones, aliphatic aldehydes, aliphatic ethers, cyclic ethers, amides of alkanoic acids and mixtures thereof. Preferably, these softening agents contain from 1 to 20 carbon atoms and more preferably from 1 to 10 carbon atoms. Examples of suitable softening agents are methylene chloride, carbon tetrachloride, chloroform, ethylene chloride, ethyl acetate, methyl formate, propylene oxide, benzene, acetonitrile, acetone, diethyl ether, tetrahydrofuran, and mixtures of such compounds. Methylene chloride is a preferred softening agent.

The foam of the present invention also is modified by forming the foam in the presence of water. Water acts as a blowing agent and also decreases the density of the foam. Preferably, the foam of the present invention if formed in the presence of from about 0.01 to about 3.5 parts by weight water per 100 parts by weight of the multi-functional isocyanate. More preferably, the foam if formed in the presence of from about 0.8 to about 1.5 parts by weight water per 100 parts by weight of the multi-functional isocyanate.

By use of the water in combination with the softening agent in forming the foams of the invention and by controlling the amount of water and softening agent with regard to the multi-functional isocyanate, a rigid, closed cell foam is produced which has a low density, good insulation properties and which sets after substantially complete rising thereof. Moreover, since setting shortly after rising is highly desirable, the water and softening agent should be present in amounts so as to provide a foam in which the gel or set time is between the initial rise time and final rise time, but in which the gel or set time is at least about 85% of the final rise time, and preferably at least about 90% of the final rise time.

While we do not wish to be held to a theory of our invention, we believe that the invention provides it desirable advantages because the softening agent acts to temporarily delay the setting or gelling of the foam until after the foam has completed its rise. We believe that there is an early rising caused by the reaction of the water with the isocyanate, i.e. a urea polymerization reaction, and that after this early rising, the softening agent works to avoid setting until the rising is substantially complete. Thus, by the present invention, the overall reaction profile is thus controlled so that a low density foam is formed which sets after substantially complete rising thereof.

In a preferred embodiment of the invention, the foam is also modified by forming the foam in the presence of a polyol. In such an instance, the foam of the invention contains urethane linkages. Preferably, the polyol has a functionality of from 2 to 8, a molecular weight of from 62 to 3000, and a hydroxy number of from about 30 to 800. The foam of the present invention can be prepared by forming the foam in the presence of from about 2 to about 300 parts by weight of the polyol per 100 parts by weight of the multi-functional isocyanate, and more preferably, from about 5 to about 20 parts by weight of a polyol, having a hydroxyl number in the 300–500 range, per 100 parts by weight of the multi-functional isocyanate. The polyols suitable for use in the present invention include those well-known in the art for inclusion in polyurethane and isocyanurate foams, such as the polyols mentioned in U.S. Pat. No. 3,887,501. Exemplary of suitable polyols are (1) hydroxy terminated polyesters such as those obtained by reacting a polycarboxylic acid with a polyhydric alcohol, (2) alkylene ether polyols such as those obtained by reacting an alkylene oxide with a polyhydric alcohol, e.g., propoxylated sucrose, and (3) aliphatic polyols such as sorbitol, sucrose, pentaerythritol, glycerol, diethanol amine, and ethylene glycol.

In yet another embodiment of the invention, the foam reaction mixture contains polyol and water so that, when mixed with the multi-functional isocyanate, a NCO/OH equivalent ratio of greater than about 1.5, preferably from about 1.5 to about 6.0 and more preferably from about 2.0 to about 6.0, is provided and the components react to form a rigid, closed cell foam which has a density in the range of from about 0.6 to about 1.5 pounds per cubic foot and which sets after substantially complete rising thereof.

The foam of the present invention can also be modified by forming the foam in the presence of a primary or secondary terminated polyamine polymerizing agent. In such an instance, the foam contains urea linkages. Suitable polyamines include those having a functionality of 2 to 10 and a molecular weight of 60 to about 3000. The polyamines suitable for use in the present invention include any of those well-known in the art for inclusion in polyurethane, polyurea and/or isocyanurate foams, such as the polyamines disclosed in U.S. Pat. No. 3,887,501. Exemplary polyamines include heterocyclic polyamines; aromatic polyamines such as methylene dianiline, crude methylene dianiline (polyarylpolyalkylene polyamine), p-aminoaniline; and aliphatic polyamines such as 1,3-propylene diamine and ethylene diamine. If desired, the foam of the present invention can be formed in the presence of from about 1 to about 100 parts by weight of the polyamine per 100 parts by weight of the multifunctional isocyanate.

In another embodiment, the present foam can be formed in the presence of an additional blowing agent besides water. Suitable blowing agents include chlorofluorinated alkanes containing from 1 to 3 carbon atoms and at least one fluorine atom, such as trichlorofluoromethane, dichlorofluoromethane, dichlorotetrafluoroethane, and trichlorotrifluoroethane; and lower molecular weight hydrocarbons containing from 4 to 7 carbon atoms, such as methane, ethane, propane, propylene, pentane, and/or hexane. Preferably, the foam of the present invention is modified by forming the foam in the presence of from about 10 to 100 parts by weight of one or more of such blowing agents per 100 parts by weight of the multi-functional isocyanate.

The foam of the present invention can also contain many other constituents well known in the art for insulation and foam materials. For example, the foam of the present invention can contain a combustion modifier such as one of the well-known phosphorous and/or halogen-containing combustion modifiers. Suitable combustion modifiers for inclusion in the foam of the present invention include Fyrol CEF, Fyrol PCF and Fyrol DMMP (all sold by Stauffer Chemical). If desired, these combustion modifiers can be included in the foam of the present invention in amounts of from about 5 to about 50 parts by weight per 100 parts by weight of the multi-functional isocyanate.

Similarly, the foam of the present invention can be prepared in the presence of surfactants, such as conventional urethane, silicone, or organic surfactants. Suitable surfactants include the well-known polysiloxanepolyalkoxane copolymers or organic surfactants used in the art to control foam cell structure. Examples of suitable surfactants include a silicone surfactant sold under the tradename L-5340 by Union Carbide Corp. and an organic surfactant sold under the tradename LK-443 by Air Products and Chemicals. Such surfactants can be included in the foam of the present invention in amounts of from about 0.01 to about 5 parts by weight per 100 parts by weight of the isocyanate.

In yet another embodiment of the invention, the foam can also be formed in the presence of a combination of urea polymerization catalyst and isocyanurate polymerization catalyst as described in the copending application No. 391,008 of Nelson Malwitz and Ronald Wierzbicki entitled "Urea-Modified Isocyanurate Foam, Composition and Method" filed the same day as the present application, the disclosure of which copending application is incorporated herein by reference. As described in such copending application, combination of the urea and isocyanurate polymerizing catalysts, when used in the manner described in the copending application, act in a way so as to control the profile of the foam reaction to give early rising and setting after substantially complete rising.

The foams of the present invention can be prepared by reacting multi-functional isocyanate in the presence of A. A catalytic amount of isocyanate polymerizing catalyst,
B. Water, and
C. A softening agent selected from the group consisting of a chlorinated alkane, brominated alkane, alkyl ester of an alkanoic acid, alkylene oxide, aromatic hydrocarbon, acylnitrile, aliphatic ketone, aliphatic aldehyde, aliphatic ether, cyclic ether, amide of an alkanoic acid, and mixtures thereof;

wherein the water and softening agent are present in amounts effective to produce a foam having a gel time which exceeds the rise time of the foam. Of course, during the formation of the foam, other materials such as polymerizing agents, blowing agents, combustion modifiers, and surfactants as mentioned above can also be included. For convenience, the multi-functional isocyanate is preferably premixed with some of the non-reactive, compatible ingredients in the formulation. Other non-reaction ingredients can be pre-mixed with the catalyst as is conventional in the art, e.g. the water, catalyst, and other ingredients such as blowing agents, polyol, etc. can be premixed. It is preferred that the formulation ingredients be divided into two parts so that only two components streams are necessary in preparing the foam, thus simplifying the application equipment. For example, in this art, the general practice is to apply the formulation by mixing thoroughly (1) the multi-functional isocyanate or premixture thereof with other reactive compatible ingredients and (2) the remaining formulation premixture(s) in a suitable mixing/dispensing device adapted advantageously for the intended application. The softening agent can be included in the multi-functional isocyanate component and/or in the catalyst/water component, since the softening agent does not react with either component. As the formulation is dispensed, conditions of temperature and pressure of the premixtures are dictated by the formulation as it pertains to obtaining the required mixedness and reaction profile.

The foam of the present invention is very advantageously used as an insulation material in filling wall cavities. This is accomplished by placing a hole in at least one wall containing the cavity which is to be filled with the foam insulation material of the present invention. The following components are simply added well mixed through the hole into the wall cavity:

A. multi-functional isocyanate,
B. a catalytic amount of isocyanate polymerizing catalyst,
C. water, and
D. a softening agent selected from the group consisting of a chlorinated alkane, brominated alkane, alkyl ester of an alkanoic acid, alkylene oxide, aromatic hydrocarbon, acylnitrile, aliphatic ketone, aliphatic aldehyde, aliphatic ether, cyclic ether, amide of an alkanoic acid, and mixtures thereof, wherein the water and softening agent are present in amounts effective to provide a gel time which exceeds the rise time for the foam. After this addition, these components are allowed to react to form the foam and to fill the cavity. Normally, a sufficient amount of the above formulation is added to completely fill the cavity. Because the foam has a gel time which exceeds the rise time of the foam, the foam of the present invention rises, and any excess foam is extruded through the hole through which the foam was added. After the foam has completed its major rise, the foam gels and sets. Because the foam of the present invention completes its major rise prior to gelling or setting, it does not exert damaging excess pressure on the walls of the cavity which has been filled. Thus, the foam of the present invention avoids the buckling and even cracking of the walls which accompanied previous techniques for filling wall cavities with urethane or isocyanurate foam insulation material.

The following examples are presented for the purpose of illustrating, but not limiting, the process of the present invention.

EXAMPLE 1

An isocyanate premix and an activator premix were prepared according to the following formulations:

|  | Parts/Hundred |
|---|---|
| Isocyanate Premix |  |
| Crude MDI[1] | 79.7 |
| Trichlorofluromethane | 18.0 |
| Fyrol CEF[2] | 2.0 |
| Methylene Chloride | 0.3 |
| Activator Premix |  |
| Carbowax 400 | 42.1 |
| Fyrol DMMP[2] | 13.1 |
| Water | 4.0 |
| Polycat 41[4] (tri(dimethyl-aminopropyl)triazine) | 3.9 |
| Trichlorofluoromethane | 35.0 |
| L-5340[3] | 2.0 |

[1] Mondur MR (MOBAY); Rubinate M (RUBICON)
[2] A halogenated phosphate fire retardant sold by Stauffer Chemical Co.
[3] A silicone surfactant sold by Union Carbide Corp.
[4] Abbott Laboratories Four parts by weight of the isocyanate premix and 1 part by weight of the activator premix were combined and intimately mixed and the foam product was allowed to form. The major rise time of the foam formed was 45 seconds, and the gel time of the foam was 70 seconds. The foam product had a density of 1.20 pounds per cubic foot.

EXAMPLE 2

The procedure of Example 1 was repeated except that a different multi-functional isocyanate was employed. The isocyanate premix had the following formulation:

| Isocyanate Premix | Parts/Hundred |
|---|---|
| Mondur E-468[1] | 79.7 |
| Trichlorofluromethane | 18.0 |
| Fyrol CEF | 2.0 |
| Methylene Chloride | 0.3 |

[1] MOBAY

The multi-functional isocyanate used in this example (Mondur E-468) is a high viscosity, higher functionality crude MDI having an average functionality of 2.8, in contrast to the multifunctional isocyanate used in Example 1 (Mondur MR) which had an average of 2.7 active cites per molecule.

The major rise time of the foam produced was found to be 75 seconds, while the gel time was found to be 135 seconds. The foam produced had a density of 1.37 pounds per cubic foot. This foam was found to be more friable than the commercial polymeric MDI used in Example 1.

EXAMPLE 3

The procedure of Example 1 was again repeated except that the isocyanate premix did not contain any methylene chloride and was formulated as follows:

| Isocyanate Premix | Parts/Hundred |
| --- | --- |
| Crude MDI (Modur MR) | 80 |
| Trichlorofluoromethane | 18.0 |
| Fyrol CEF | 2.0 |
| Methylene Chloride | — |

The major rise time of the foam was found to be 95 seconds, while the gel time was found to be 55 seconds. The density of the foam was found to be 1.17 pounds per cubic foot.

The results of this Example demonstrate that the absence of the softening agent results in a rise time which is greater than the gel time of the foam, making this foam unsuitable for retrofit insulation application.

EXAMPLE 4

The procedure of Example 1 is again repeated except that additional methylene chloride was uded in the isocyanate premix, which had the following formulation:

| Isocyanate Premix | Parts/Hundred |
| --- | --- |
| Crude MDI (Mondur MR) | 79.4 |
| Trichlorofluoromethane | 18.0 |
| Fyrol CEF | 2.0 |
| Methylene Chloride | 0.6 |

The isocyanate and activated premixes were combined and intimately mixed in a 4:1 weight ratio and allowed to react to form the foam. The major rise time of the foam was found to be 38 seconds, while the gel time was found to be 54 seconds. The density of the foam produced was 1.34 pounds per cubic foot.

This foam of the invention provides the desired characteristics of gel time greater than rise time, but it should be pointed out that the dimensional stability of this foam at 0° F. is not as good as the foam product of Example 1.

EXAMPLE 5

The procedure of Example 1 was repeated except that a still larger proportion of methylene chloride was used in the isocyanate premix, which had the following formulation:

| Isocyanate Premix | Parts/Hundred |
| --- | --- |
| Crude MDI (Mondur MR) | 79.1 |
| Trichlorofluoromethane | 18.0 |
| Fyrol CEF | 2.0 |
| Methylene Chloride | 0.9 |

The isocyanate and activated premixes were combined and intimately mixed in a 4:1 ratio and a foam product was allowed to form. The major rise time of the foam produced was found to be 50 seconds, while the gel time was found to be 90 seconds. The density of the foam product was 1.66 pounds per cubic foot.

This Example demonstrates that at a softening agent at too high a level provides a rise time greater than gel time, but the density of the foam material is high. In addition, the dimensional stability of the foam over a storage range of 0° F. to 140° F. is not as good as the foam of Example 1.

EXAMPLE 6

The procedure of Example 1 was repeated except that the activator premix contained no water and thus had a formulation as follows:

| Activator Premix | Parts/Hundred |
| --- | --- |
| Carbowax 400 | 42.1 |
| Fyrol DMMP | 13.0 |
| Water | — |
| Polycat 41 | 3.9 |
| Trichlorofluoromethane | 39.0 |
| L-5340 Silicone | 2.0 |

The isocyanate and activator premixes are combined and intimately mixed in a ratio of 4:1 by weight and the foam product was allowed to form. The major rise time of the foam was found to be 295 seconds, while the gel time was found to be 120 seconds. The density of the foam produced was 1.66 pounds per cubic foot.

This example demonstrates that without water being present during the foam production, the rise time of the foam exceeds the gel time and the density of the foam produced is high.

EXAMPLE 7

The procedure of Example 1 was again repeated except that activator premix contained additional trichlorofluoromethane and no water. Thus, the activator formulation was as follows:

| Actuator Premix | Parts/Hundred |
| --- | --- |
| Carbowax 400 | 27 |
| Fyrol DMMP | 13.0 |
| Water | — |
| Polycat 41 | 10.0 |
| Trichlorofluoromethane | 48.0 |
| L-5340 Silicone | 2.0 |

The isocyanate and activator premixes were combined and intimately mixed at a weight ratio of 4:1 and the foam was allowed to form. The major rise time was found to be 285 seconds, while the gel time was found to be 135 seconds. The density of the foam produced was 1.34 pounds per cubic foot.

This example again demonstrates that without water being present the rise time of the foam is greater than the gel time. In addition, the foam produced by this example is coarse.

EXAMPLE 8

The procedure of Example 1 was repeated except that toluene was used in place of methylenechloride in the isocyanate premix. The foam produced was found to have a major rise time of 55 seconds and a gel time of 65 seconds. The density of the foam produced was 1.3 pounds per cubic foot.

EXAMPLE 9

The procedure of Example 1 was again repeated except that tetrahydrofuran was used in place of methylene chloride in the isocyanate premix. The foam produced was found to have a major rise time of 45 seconds and a gel time of 55 seconds. The density of the foam was 1.37 pounds per cubic foot.

EXAMPLE 10

The procedure of Example 1 was again repeated except that acetone was used in place of methylene chloride in the isocyanate premix. The major rise time of the foam produced was found to be 45 seconds, while the gel time was found to be 55 seconds. The density of the foam was 1.46 pounds per cubic foot.

This example demonstrates that acetone is effective as a softening agent, but it should be pointed out that the foam produced by this Example has some shrinkage and has coarser cells than for the foam of Example 1.

EXAMPLE 11

The procedure of Example 1 was repeated except that N-methyl pyrrolidone was used in place of methylene chloride in the isocyanate premix. The major rise time of the foam produced was found to be 45 seconds, while the gel time was found to 55 seconds. The density of the foam produced was found to be 1.46 pounds per cubic foot.

This Example demonstrates that N-methylpyrrolidone is effective as a softening agent, but the density is higher than the foam of Example 1 and therefore N-methyl pyrrolidone is not as preferred as say methylene chloride. In addition, it should also be pointed out that the cells of the foam of this Example are coarser and have more shrinkage than the foam of Example 1.

EXAMPLE 12

The procedure of Example 1 was repeated except that the polysiloxane-polyalkoxane copolymer surfactant was replaced with an organic surfactant in the activator premix formulation. The activator premix formulation was as follows:

| Activator Premix | Parts/Hundred |
| --- | --- |
| Carbowax 400 | 42.1 |
| Fyrol DMMP | 13.0 |
| Water | 4.0 |
| Polycat 41 | 3.9 |
| Trichlorofluoromethane | 35.0 |
| LK-443[1] | 2.0 |

[1](Organic surfactant sold by Air Products and Chemicals)

The major rise time of the foam produced was found to be 41 seconds and the gel time was found to be 51 seconds. The foam produced had a density of 1.3 pounds per cubic foot.

EXAMPLE 13

The procedure of Example 1 was repeated except that an additional polymerizing catalyst was used in the activated premix. Specifically, potassium octoate was added to the polymerizing catalyst. The activator premix had a formulation as follows:

| Activator Premix | Parts/Hundred |
| --- | --- |
| Carbowax 400 | 42.1 |
| Fyrol DMMP | 13.0 |
| Water | 4.0 |
| Polycat 41 | 1.95 |
| Polycat 42 | 1.95 |
| (Mix of Polycat 41 and potassium octoate) | |
| Trichlorofluoromethane | 35.0 |
| L-5340 Silicone | 2.0 |

This example demonstrates that other isocyanate polymerizing catalysts can be employed in the process and foam of the present invention. Specifically, potassium octoate in combination with tri(dimethylaminopropyl)triazine produced a foam of acceptable process dynamics. The foam produced had a rise time of 48 seconds and a gel time of 60 seconds. The density of the foam produced was 1.26 pounds per cubic foot.

EXAMPLE 14

The procedure of Example 1 was again repeated except that, in addition to Carbowax 400, Pluracol 410 was employed as an additional polyol. Pluracol 410 is a polypropoxylated diol. The activator premix had a formulation as follows:

| Activator Premix | Parts/Hundred |
| --- | --- |
| Carbowax 400 | 28.1 |
| Pluracol 410 (BASF Wyandotte) | 14.0 |
| Fyrol DMMP | 13.0 |
| Water | 4.0 |
| Polycat 41 | 3.9 |
| Trichlorofluoromethane | 35.0 |
| L-5340 Silicone | 2.0 |

The major rise time of the foam produced was found to be 58 seconds and the gel time was found to 79 seconds. The density of the foam was 1.3 pounds per cubic foot.

EXAMPLE 15

The procedure of Example 1 was again repeated except that a primary terminated polyamine, Jeffamine T-403, was used as an additional polymerizing agent. The activator premix had a formulation as follows:

| Activator Premix | Parts/Hundred |
| --- | --- |
| Carbowax 400 | 42.1 |
| Jeffamine T-403 (Texaco) | 5.0 |
| Fyrol DMMP | 13.0 |
| Water | 4.0 |
| Polycat 41 | 3.9 |
| Trichlorofluoromethane | 35.0 |
| L-5340 Silicone | 2.0 |

The foam produced had a major rise time of 50 seconds and a gel time of 85 seconds. The foam had a density of 1.41 pounds per cubic foot.

EXAMPLE 16

The procedure of Example 1 was repeated except that diethanolamine was used as an additional polymerizing agent. The activator premix had a formulation as follows:

| Activator Premix | Parts/Hundred |
|---|---|
| Carbowax 400 | 42.1 |
| Diethanolamine | 5.0 |
| Fyrol DMMP | 13.0 |
| Water | 5 |
| Polycat 41 | 3.9 |
| Trichlorofluoromethane | 35.0 |
| L-5340 Silicone | 2.0 |

The major rise time of the foam produced was found to be 24 seconds, while the gel time was found to be 65 seconds. The foam produced had a density of 1.45 pounds per cubic foot.

EXAMPLE 17

The procedure of Example 1 was repeated except that no polymerizing agent was used in the activator premix. The activator premix had a formulation as follows:

| Activator Premix | Parts/Hundred |
|---|---|
| Fyrol DMMP | 22.5 |
| Water | 7.0 |
| Polycat 41 | 6.7 |
| Trichlorofluoromethane | 60.3 |
| L-5340 Silicone | 3.5 |

The foam produced was found to have a major rise time of 77 seconds and a gel time of 140 seconds. The density of the foam produced was 0.99 pounds per cubic foot.

It will be understood that the embodiments described above are merely exemplary and that persons skilled in the art may make many variations and modifications without departing from the spirit and scope of the invention. All such modifications and variations are intended to be included within the scope of the invention as defined by the appended claims.

What is claimed is:

1. A process for filling a wall cavity with insulation comprising the steps of
    opening a hole into said cavity;
    adding foam forming reactants to said cavity through said hole in amounts such that the foam produced will at least fill said cavity, said foam forming reactants comprising a multi-functional isocyanate selected from diphenyl methane diisocyanate, prepolymers of diphenyl methane diisocyanate and mixture thereof; a catalytic amount of isocyanate polymerizing catalyst; water; and a softening agent selected from the group consisting of a chlorinated alkane, brominated alkane, alkyl ester of an alkanoic acid, alkylene oxide, aromatic hydrocarbon, acylnitrile, aliphatic ketone, aliphatic aldehyde, aliphatic ether, cyclic ether, amide of an alkanoic acid, and mixtures thereof; wherein said water and said softening agent are present in an amount effective to provide a gel time which exceeds the rise time for said foam; and
    allowing said components to form said foam and to fill said cavity.

2. A process according to claim 1, wherein said foam is formed in the presence of from about 0.05 to about 5 parts by weight of said softening agent per 100 parts by weight of said multi-functional isocyanate.

3. A process according to claim 1, wherein said foam is modified by forming said foam in the presence of from about 0.01 to 3.5 parts by weight water per 100 parts by weight of said multi-functional isocyanate.

4. A process according to claim 1, wherein said softening agent is selected from the group consisting of methylene chloride, carbon tetrachloride, ethyl acetate, methyl formate, propylene oxide, benzene, N-methyl pyrrolidone, acetonitrile, ethylene chloride, ethyl ether, acetone, tetrahydrofuran and mixtures thereof.

5. A process according to claim 1, wherein said softening agent is methylene chloride.

6. A process according to claim 1, wherein said softening agent is acetone.

7. A process according to claim 1, wherein said multi-functional isocyanate is crude diphenyl methane diisocyanate.

8. A process according to claim 1, wherein said isocyanate polymerizing catalyst is an isocyanurate catalyst.

9. A process according to claim 8, wherein said isocyanurate catalyst is an amine or amine salt catalyst.

10. A process according to claim 1, wherein said isocyanate polymerizing catalyst is a carbodiimide catalyst.

11. A process according to claim 1, wherein said foam is modified by forming said foam in the presence of a member selected from the group consisting of polyol, primary or secondary terminated polyamine, and mixtures thereof.

12. A process according to claim 1, wherein said foam is formed in the presence of polyol and said foam contains urethane linkages.

13. A process according to claim 12, wherein the amounts of said polyol, water, and multi-functional isocyanate are such as to provide a NCO/OH equivalent ratio of greater than 1.5 and to provide foam having a density of from about 0.6 to about 1.5 pounds per cubic foot.

14. A process acccording to claim 13, wherein said polyol has a functionality of from 2 to 8, a molecular weight of from 60 to 3000 and a hydroxy number of from 30 to 800.

15. A process according to claim 14, wherein said foam is formed in the presence of from about 5 to about 300 parts by weight of said polyol per 100 parts by weight of the multi-functional isocyanate.

16. A process according to claim 1, wherein said foam is formed in the presence of primary or secondary terminated polyamine and said foam contains urea linkages.

17. A process according to claim 1, wherein said foam is modified by forming said foam in the presence of a blowing agent selected from the group consisting of (1) chlorofluorinated alkanes having from 1 to 3 carbon atoms and at least one fluorine atom; and (2) hydrocarbons having from 4 to 7 carbon atoms.

18. A process according to claim 17, wherein said foam is modified by forming said foam in the presence of from about 10 to about 100 parts by weight of said blowing agent per 100 parts by weight of said multi-functional isocyanate.

19. A process according to claim 18, wherein said blowing agent is trichlorofluoromethane.

20. A process according to claim 1, wherein said foam contains a combustion modifier.

21. A process according to claim 1, wherein said foam contains a surfactant.

22. A process for filling a wall cavity with insulation comprising the steps of opening a hole into said cavity;

adding foam forming reactants to said cavity through said hole in amounts such that the foam produced will at least fill said cavity, said foam forming reactants comprising crude diphenyl methane diisocyanate, a catalytic amount of isocyanurate polymerizing catalyst, water, and methylene chloride, wherein said water and methylene chloride are present in amounts effective to provide a gel time which exceeds the rise time for said foam; and allowing said foam forming reactants to form said foam and to fill said cavity.

* * * * *

UNITED STATES PATENT AND TRADEMARK OFFICE
CERTIFICATE OF CORRECTION

PATENT NO. : 4,430,840
DATED : February 14, 1984
INVENTOR(S) : MALWITZ

It is certified that error appears in the above-identified patent and that said Letters Patent are hereby corrected as shown below:

Column 3, line 42, "diphenylmeane" should read --diphenylmethane--.
Column 3, line 55, "MID" should read --MDI--.
Column 8, line 34, EXAMPLE 1, under column entitled Parts/Hundred, "13.1" should read --13.0--.

Signed and Sealed this

Seventh Day of August 1984

[SEAL]

Attest:

GERALD J. MOSSINGHOFF

Attesting Officer

Commissioner of Patents and Trademarks